INVENTOR
N. S. HIGGINS
BY *Jules P. Kirsch*
ATTORNEY

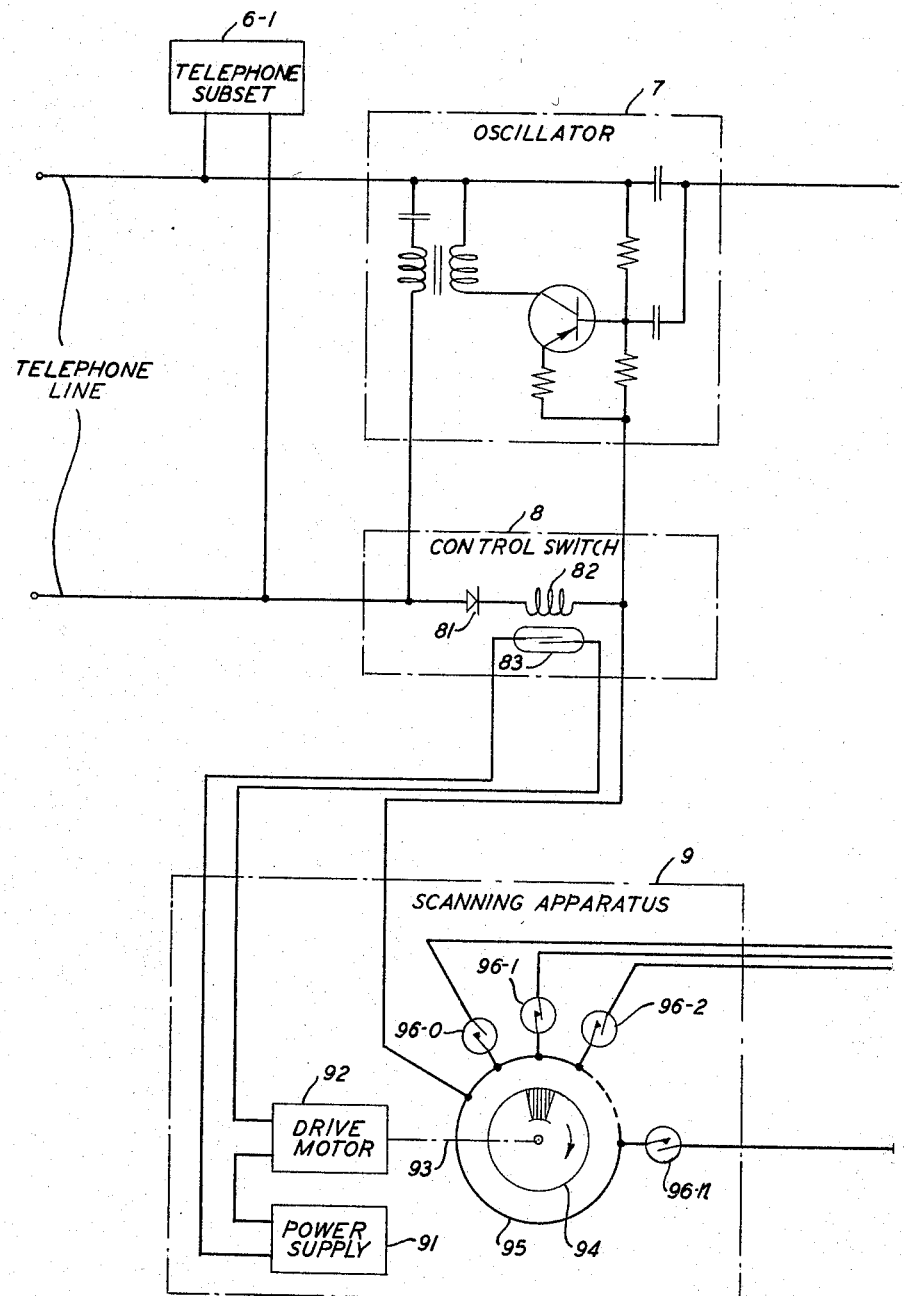

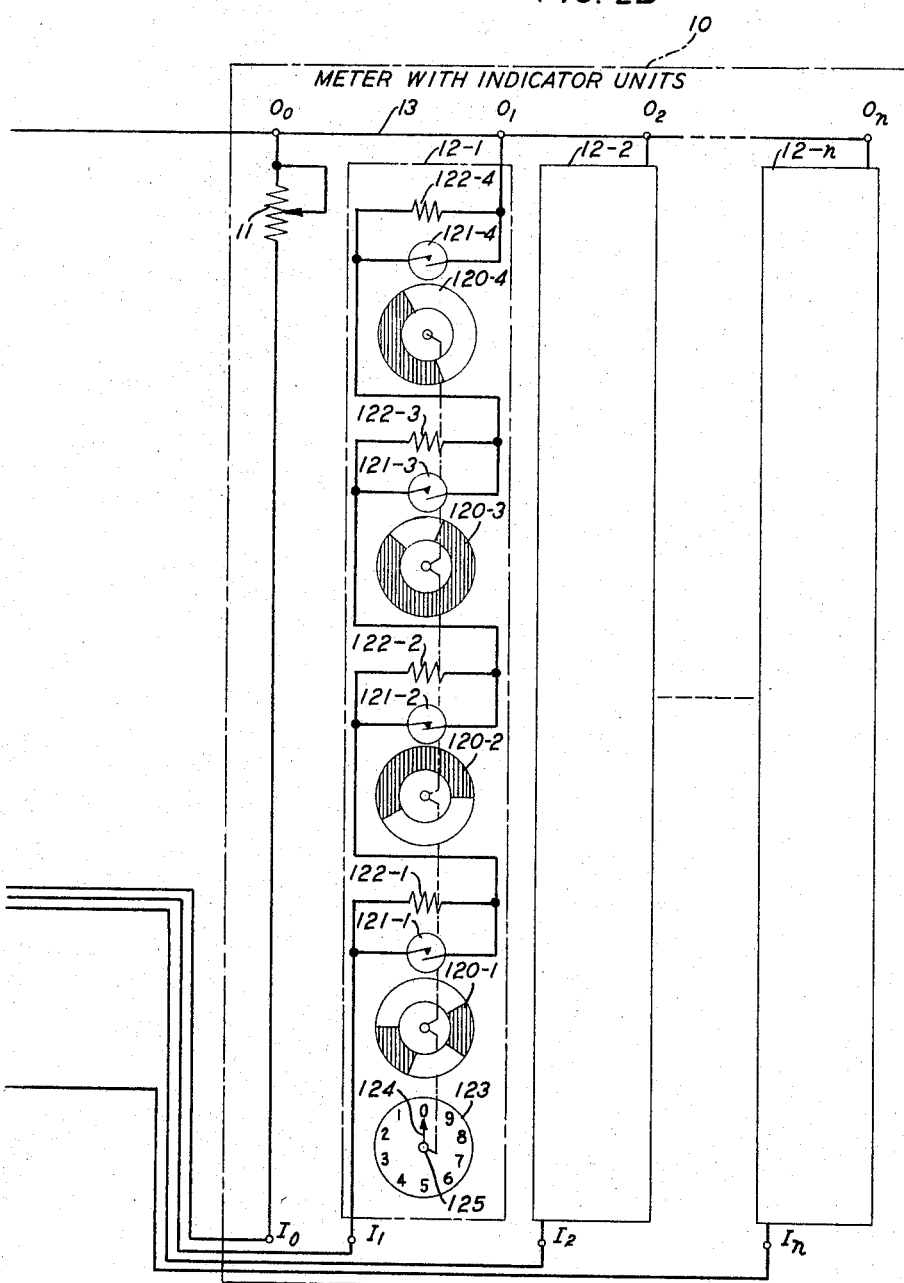

Aug. 9, 1966
N. S. HIGGINS
3,266,018
TELEMETERING SYSTEM FOR READING REMOTELY
LOCATED UTILITY METERS
Filed Oct. 4, 1962
5 Sheets-Sheet 4
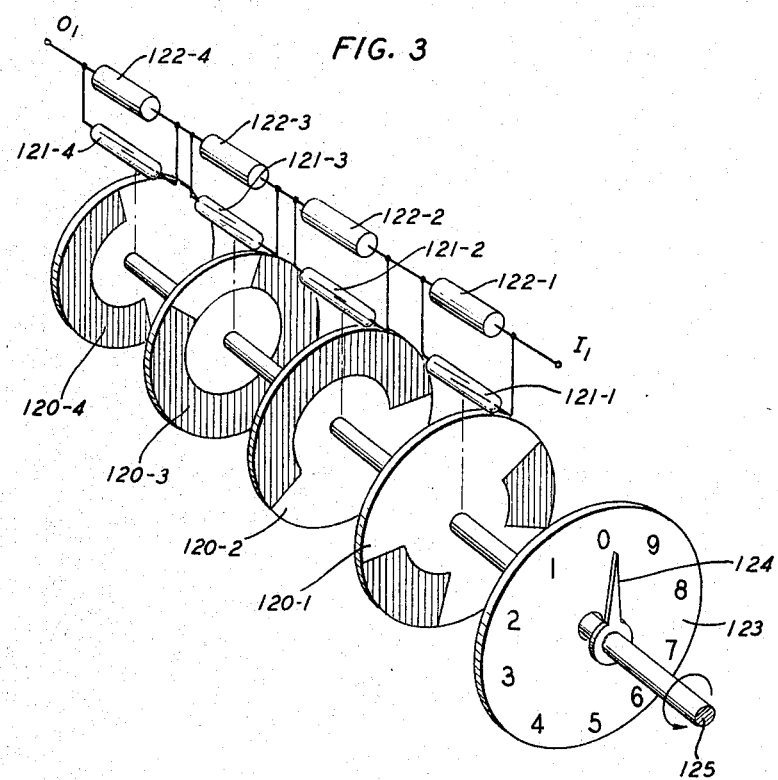
INVENTOR
N. S. HIGGINS
BY
Jules P. Kirsch
ATTORNEY Aug. 9, 1966
N. S. HIGGINS
TELEMETERING SYSTEM FOR READING REMOTELY LOCATED UTILITY METERS
3,266,018
Filed Oct. 4, 1962
5 Sheets-Sheet 5
FIG. 4A
| CODING | |
|---|---|
| DECIMAL | REFLECTED BINARY EXCESS 3 |
| 0 | 0010 |
| 1 | 0110 |
| 2 | 0111 |
| 3 | 0101 |
| 4 | 0100 |
| 5 | 1100 |
| 6 | 1101 |
| 7 | 1111 |
| 8 | 1110 |
| 9 | 1010 |
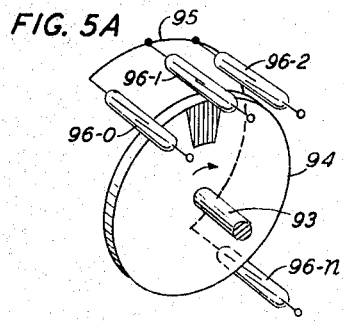
FIG. 5A
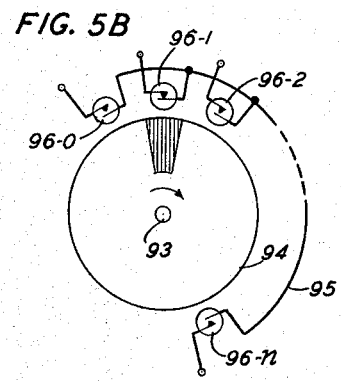
FIG. 5B
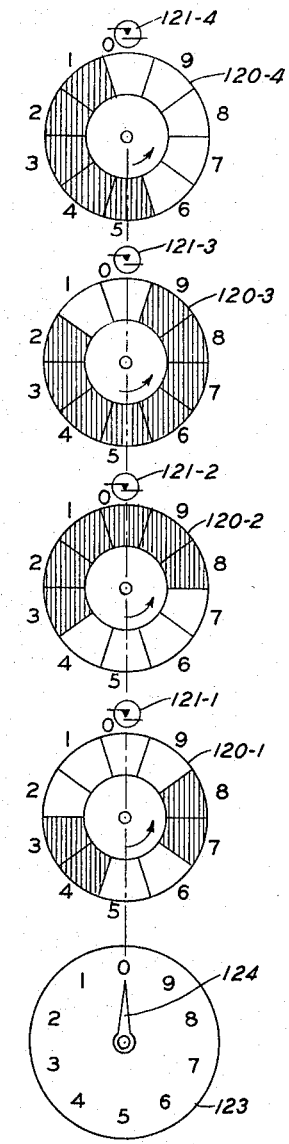
FIG. 4B
INVENTOR
N. S. HIGGINS
BY
Jules P. Kirsch
ATTORNEY

United States Patent Office 3,266,018
Patented August 9, 1966

3,266,018
TELEMETERING SYSTEM FOR READING REMOTELY LOCATED UTILITY METERS
Neil S. Higgins, Jersey City, N.J., assignor to American Telephone and Telegraph Company, New York, N.Y., a corporation of New York
Filed Oct. 4, 1962, Ser. No. 228,333
5 Claims. (Cl. 340—151)

This invention relates to telemetering systems, and in particular to systems for automatically reading remotely located utility meters from a central station.

Public utility systems that supply services such as gas, electricity, and water generally provide at each customer's location a meter for measuring the amount of the particular service that is consumed. In order to bill each customer for the services provided, utility systems typically employ a number of persons to visit each meter periodically and to read visually the amount of service consumed. Since the number of individual customers receiving the above services in a given locality is ordinarily quite large, the employment of sufficient persons to read meters in this fashion involves a considerable expense on the part of local utility systems. In addition, there is always a small but significant number of meters which are not accessible at any given time, thereby requiring additional visits by meter reading employees and further increasing the expense of reading meters.

In order to reduce the expense of reading meters, the present invention provides an automatic telemetering system which may be operated by a relatively small number of persons to read meters faster and more economically than the present visual arrangement described above. The telemetering system of this invention comprises a central station at which the operating personnel are located, and a separate remote station at each customer's location. The central station and the remote stations are linked by a suitable medium, for example, a telephone network, and the reading of a meter at a remote station is initiated by an electrical interrogating signal sent from the central station to the remote station through the linking medium. At the remote station of this invention, the interrogating signal is converted automatically into a data signal representative of the reading of the meter, and from the information conveyed by the data signal, a suitable record is made at the central station for use in billing the customer for the amount of service consumed.

In the remote station of this invention, automatic conversion of the interrogating signal into a data signal starts with the sequential application of the interrogating signal to a number of electrical networks or paths whose instantaneous resistances are representative of the instantaneous reading of the meter apparatus of this invention. The electrical paths form a part of a variable frequency oscillator that generates from the sequentially applied interrogating signal a data signal comprising a corresponding sequence of components whose frequencies are indicative of the resistances of the electrical paths and therefore of the reading of the meter. At the central station, the frequencies of the data signal components are detected, and the reading represented by the sequence of frequencies is stored in an appropriate form.

The resistances of the above-mentioned electrical networks are varied to represent the instantaneous reading of the meter by a corresponding set of indicator units that comprise the meter apparatus of the present invention. Each indicator unit contains a stationary dial face and an indicator pointer mounted on a rotatable shaft driven by the meter. The shaft in each indicator unit is made sufficiently long to accommodate a number of so-called code discs mounted substantially parallel to the dial face. The annulus of each code disc is constructed of magnetic and nonmagnetic sectors according to a prearranged code, and disposed about each code disc is a magnetically actuated switch. As the shaft rotates, the code discs also rotate, and whenever the magnetic sector of a code disc is in juxtaposition with its corresponding switch, the switch changes from an open condition to a closed condition. At a given instant, the open and closed conditions of the switches in an indicator unit represent in coded form the reading of the indicator unit, which may also be obtained visually from the position of the pointer with respect to the dial face.

By connecting the switches of each indicator unit in parallel with the resistance elements in the corresponding electrical network, each switch shunts a corresponding resistance element whenever a magnetic sector of a code disc is in juxtaposition with the switch. In this fashion, the instantaneous resistance of a network represents the instantaneous reading of an indicator unit, which in turn is reflected in the frequency of a corresponding component of the data signal generated by the oscillator from the interrogating signal passing through the network.

A particular advantage of the meter apparatus of this invention is the relatively small expense required to incorporate the features of the indicator units into existing meter apparatus. For example, conventional meters already contain a number of dial faces and associated pointers secured to rotatable shafts which are driven by the meter. Hence, existing meters may be adapted to the telemetering system of the present invention at relatively low cost.

The invention will be fully understood from the following detailed description of illustrative embodiments thereof taken in connection with the appended drawings, in which:

FIGS. 2A and 2B are diagrams showing details of the remote station apparatus of this invention;

FIG. 2C is a diagram showing the relationship between FIGS. 2A and 2B;

FIG. 3 is a perspective view of a suitable arrangement of the elements of a single indicator unit at a remote station;

FIGS. 4A and 4B illustrate a suitable coding principle for constructing the indicator unit of this invention; and FIGS. 5A and 5B show perspective and plan views, respectively, of certain components of the scanning apparatus of FIG. 2A.

COMPLETE SYSTEM

Figure 1:
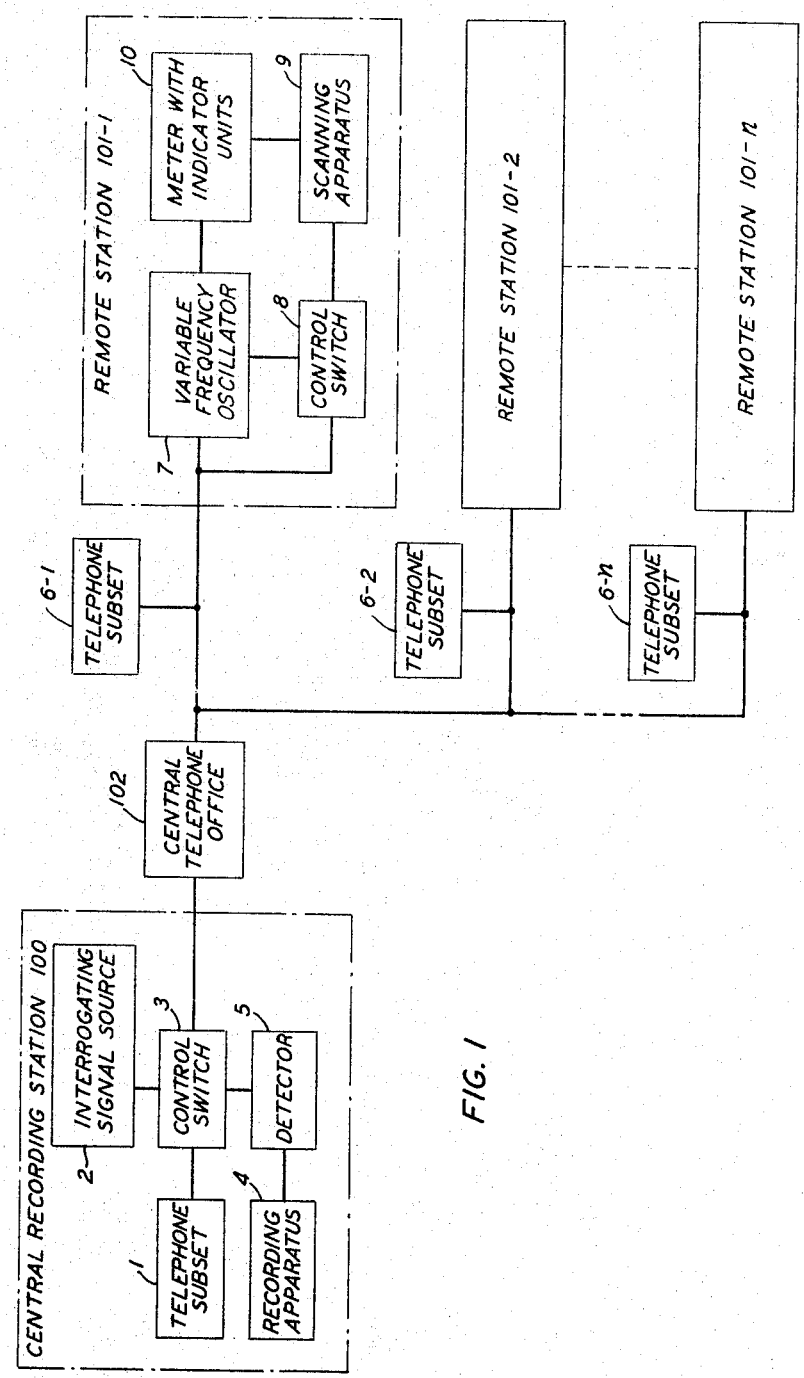
FIG. 1 is a schematic block diagram of a complete telemetering system embodying the principles of this invention.

Referring first to FIG. 1, this drawing illustrates a complete telemetering system for automatically reading a plurality of remotely located meters from a central recording station. At central recording station 100, a conventional telephone subscriber's subset is used to establish a connection to one of a plurality of remote stations 101-1 through 101-n through a central telephone office 102 and subsets 6-1 through 6-n. If the telephone line at the called station is busy, the connection is broken, and a call is placed to the next remote meter station. If the telephone line at the called station is idle, then control switch 3 is operated to connect interrogating signal source 2 to the line. Control switch 3 may be either a manually operated double pole, triple-throw switch, or a group of suitably timed relays. Source 2 generates an interrogating signal that is transmitted to the called station, for example, remote station 101-1, in order to initiate the operation of the remote station equipment.

Upon receiving the interrogating signal at remote station 101-1, control switch 8, which is shown in detail in FIG. 2A together with the other components of station 101–1, passes the signal to scanning apparatus 9 and variable frequency oscillator 7. The interrogating signal actuates scanning apparatus 9 which delivers the interrogating signal to meter 10, and powers oscillator 7 so that the interrogating signal passed through meter 10 may be automatically converted into a data signal indicative of the reading of meter 10 at that instant. The data signal from oscillator 7 is detected at central recording station 100, where switch 3 is operated to pass the data signal to detector 5. Detector 5 changes the data signal into a form suitable for recording, and recording apparatus 4 makes a permanent record from the output signal of detector 5. Recording apparatus 4 may comprise automatic translating and billing equipment analogous to the automatic message accounting systems which are well known in the telephone art.

After recording the information contained in a data signal from a particular remote station, the connection to that station is terminated, and a connection to another station is established until all of the remote stations have been interrogated. It is apparent, however, that a number of remote stations may be read at the same time by providing additional apparatus at central station 100.

REMOTE STATION APPARATUS

FIGS. 2A and 2B illustrate in detail the structure of remote station 101–1 of FIG. 1, it being understood that the structure of each remote station in FIG. 1 is identical with that shown in FIGS. 2A and 2B. After a connection has been established to telephone subset 6–1 at the customer's location, an interrogating signal from the central recording station is sent over the telephone line to control switch 8. The interrogating signal utilized in the embodiment shown in FIG. 2A is a direct-current signal whose polarity is opposite to that of the regular battery signal from the telephone central office, and diode 81 is so poled that the regular battery signal does not pass to the remote meter apparatus. However, when a connection is established from the central recording station to the remote station, the central office battery is disconnected and the interrogating signal is passed by diode 81 to the other components of remote station 101–1. It will be apparent to those skilled in the telephone art that an alternating-current signal may be utilized as an interrogating signal instead of a direct-current signal, with appropriate modifications of the structure of control switch 8.

Diode 81 passes the interrogating signal to coil 82 to generate a magnetic field and thereby close the contacts of magnetic reed switch 83, where switch 83 may be of the type disclosed in W. B. Ellwood Patent 2,289,830, issued July 14, 1942. As shown in FIG. 2A and in the Ellwood patent, switch 83 comprises two magnetic reeds or contacts enclosed in a gas-tight envelope made of a material such as glass, thereby preventing interaction between the contacts and undesired environmental influences external to the envelope. Reed switch 83 is interposed between power supply 91 and drive motor 92 of scanning apparatus 9 so that the closing of switch 83 actuates drive motor 92. In addition, the output terminal of coil 82 is connected to oscillator 7 and common conductor 95 of scanning apparatus 9 in order to pass the interrogating signal through meter 10 to oscillator 7 for conversion into a data signal indicative of the reading of meter 10.

Within scanning apparatus 9, a relatively thin, circular disc 94 is secured to the rotatable drive shaft 93 of motor 92 so that after motor 92 is actuated by the closing of magnetic reed switch 83, the rotation of shaft 93 turns disc 94. The structure of disc 94 is illustrated in detail in FIGS. 5A and 5B, where the shaded annular sector indicates that this portion of the disc is composed of a permanent magnetic material having a relatively high coercive force, for example, barium ferrite, and the unshaded area indicates that the remaining portion of the disc is constructed of a suitable nonmagnetic material.

Surrounding disc 94 are a plurality of $n+1$ magnetic reed switches 96–0 through 96–$n$ which may be of a construction similar to that of reed switch 83. Reed switches 96–0 through 96–$n$ are positioned so that the normally open gap in each switch is bisected by a plane perpendicular to shaft 93 and lying approximately midway between the opposite faces of disc 94. In addition, each reed switch is positioned sufficiently close to disc 94, without touching disc 94, so that as the edge of the magnetic portion of disc 94 rotates to be successively in juxtaposition with the gap between the contacts of each switch, the magnetic field of the magnetic portion of the disc successively closes the contacts of not more than one switch at a time. By way of example, FIG. 5B illustrates a position of disc 94 in which the contacts of reed switch 96–1 are closed by the magnetic field of the magnetic portion of disc 94, and in which it is observed that the contacts of all of the other switches are open.

Returning to FIG. 2A, the input terminals of reed switches 96–0 through 96–$n$ are connected through common conductor 95 to the output terminal of coil 82, while the output terminal of each reed switch 96–0 through 96–$n$ is connected to a corresponding input point $I_0$ through $I_n$, respectively, of meter 10 in FIG. 2B. By this arrangement, the successive closing of the contacts of reed switches 96–0 through 96–$n$ due to the rotation of disc 94 causes the interrogating signal from coil 82 to be successively applied to input points $I_0$ through $I_n$ of meter 10.

Input points $I_0$ through $I_n$ lead to $(n+1)$ corresponding electrical networks whose resistances indicate the reading of meter 10 in the manner described below. Each electrical network is terminated in an output point $O_0$ through $O_n$, respectively, and the output points are connected to oscillator 7 by means of a common conductor 13. Oscillator 7 is a conventional transistorized resistance-capacitance circuit for generating from the interrogating signal successively appearing at output points $O_0$ through $O_n$ of meter 10 a corresponding succession of $(n+1)$ output signals whose frequencies are primarily a function of the resistances of the successive networks to which the interrogating signal is applied within meter 10. The succession of output signals generated by oscillator 7 constitute the data signal of this invention from which the central recording station makes a record of the reading of meter 10.

The resistances of the electrical networks in meter 10 indicate the reading of meter 10 in the following manner. The first electrical network to which the interrogating signal is applied extends between input point $I_0$ and output point $O_0$ and comprises an adjustable resistor 11 whose resistance is set at a predetermined value; hence the first component of the data signal generated by oscillator 7 is normally constant in frequency. This first component serves to indicate to the central recording station the start of the telemetering of a particular remote station. In addition, any deviation in frequency of the first component from its preassigned constant value serves as an indication of possible malfunctioning of the remote station apparatus.

If desired, the single reference network between points $I_0$ and $O_0$ may be replaced by a plurality of reference networks between a corresponding plurality of input and output points in order to identify each remote station with a plurality of frequency components instead of a single frequency components. Of course, each reference network requires a separate connection to scanning apparatus 9, and within scanning apparatus 9 reed switch 96–0 must be replaced by a separate reed switch for each reference network.

Each of the succeeding electrical networks to which the interrogating signal is applied in meter 10 corresponds to so-called indicator units 12–1 through 12–$n$. These indicator units are in one-to-one correspondence with the number of digits used to measure the quantity of service which is consumed; for example, if the quantity of service is measured in terms of an $n=6$ digit decimal number, then meter 10 contains $n=6$ indicator units. Since the range of values of each digit in conventional numbering systems is identical, that is, in a decimal system each digit varies over the same range of ten values from 0 through 9, the indicator units in meter 10 are identical in structure with each other; therefore, only indicator unit 12–1 is shown in detail in FIG. 2b.

Each electrical network comprises a plurality of resistance elements connected in series, with a magnetic reed switch being connected in parallel with each resistor. In the embodiment illustrated in FIG. 2B, the electrical network corresponding to unit 12–1 comprises four resistors 122–1 through 122–4 connected in series, with magnetic reed switches 121–1 through 121–4 each being connected in parallel with a corresponding resistor. The resistance values of the resistors may be chosen to produce whatever discrete frequencies are desired in the signals generated by oscillator 7.

The total resistance of each network is varied to reflect the ten possible values of the decimal digit indicated by each indicator unit by the coding arrangement shown in FIGS. 2A, 2B, and 3. It is to be noted at this point that FIG. 3 shows a perspective view of a suitable structure for indicator unit 12–1, while FIG. 2B illustrates only the functional relationships between the elements of unit 12–1. It is to be understood that structural arrangements other than that shown in FIG. 3 may be utilized if desired.

Within unit 12–1 there is provided a stationary dial face 123 inscribed with the ten possible values, zero through nine, of the decimal digit to be indicated by unit 12–1. The instantaneous value of the digit represented by unit 12–1 is indicated visually by the angular position of an indicator pointer 124 with respect to the numbers on the face of dial 123. Pointer 124 is secured to a rotatable shaft 125 which is driven by a conventional meter mechanism (not shown) in response to consumption of the particular service being supplied.

Also secured to shaft 125 are a plurality of code discs 120–1 through 120–4 each of which contains an annulus constructed of magnetic and nonmagnetic sectors. The magnetic sectors may be a permanent magnetic material of high coercive force such as barium ferrite, these magnetic sectors being indicated by the shaded areas in the drawings. The size and location of each magnetic sector is constructed according to the code that is explained below in connection with FIGS. 4A and 4B, and the remaining portion of each disc, as indicated by the unshaded areas in the drawings, is constructed of any suitable lightweight, nonmagnetic material. By using a high coercive force material such as barium ferrite for the magnetic sectors of the discs, however, the total weight of the discs in an indicator unit remains sufficiently small so that the magnitude of the torque required to rotate shaft 125 is on the order of that required to rotate the analogous shaft in a conventional meter.

The resistance of the electrical network corresponding to unit 12–1 is made to vary as a functioin of the instantaneous value of the digit represented by unit 12–1 by locating each magnetic reed switch in close proximity to its corresponding code disc, a suitable arrangement being shown in FIG. 3. Each reed switch is positioned so that the normally open gap between its two contacts is bisected by a plane perpendicular to shaft 125 and lying approximately midway between the opposite faces of the corresponding code disc. In addition, each switch is positioned sufficiently close to its corresponding disc, without touching the disc, so that whenever a magnetic sector of the disc is in juxtaposition with the normally open gap between the pair of contacts of the switch, the magnetic field of the sector closes the contacts of the switch. Further, the magnetic reed switches are positioned in alignment with a predetermined reference point; for example, as shown in FIGS. 2B and 3, the alignment is with respect to the numeral "0" on the face of dial 123.

The resistance of the corresponding electrical network therefore varies with the instantaneous value of the digit represented by unit 12–1 because whenever a magnetic sector of a code disc is in juxtaposition with its associated reed switch, the closing of the contacts of the switch shunts the resistor with which the switch is connected in parallel. These variations in resistance are reflected in the discrete frequency of the output signal generated by oscillator 7 from the interrogating signal applied to the network corresponding to unit 12–1.

The specific manner in which the resistance of an electrical network in meter 10 is varied depends upon the coding principle utilized to construct the configurations of the magnetic and nonmagnetic sections of the code discs. The embodiment of a preferred code is illustrated in FIGS. 4A and 4B, where the code is the well-known reflected binary, excess three code, an explanation of which may be found in Reference Date for Radio Engineers, by International Telephone and Telegraph Corporation, pages 882 and 884 (4th edition, 1956). This code possesses two advantages: (1) at least one reed switch is closed for every one of the ten values, including zero, of each digit thereby providing positive identification of each value of each digit; and (2) a change from one value of a digit to the next is accompanied by a change in the open or closed condition of no more than a single reed switch, thus minimizing possible errors in the reading of the meter.

Referring to FIGS. 4A and 4B, the annular portion of each code disc may be considered to comprise ten sectors of equal size, corresponding to the ten values represented by the numerals on dial 123. For convenience in description, these ten sectors are labeled in FIG. 4B "0" through "9" in the same counterclockwise sense as the numerals on dial 123. The magnetic sectors of code disc 120–1 are therefore sectors labeled 3, 4, 7, and 8, of disc 120–2, sectors labeled 8, 9, 0, 1, 2, and 3, of disc 120–3, sectors labeled 2 through 9 and of disc 120–4, sectors labeled 1 through 5.

For example, when unit 12–1 indicates a value of zero, pointer 124 points to the numeral "0" on dial 123, the contacts of reed switches 121–1, 121–3, and 121–4 are open, and the contacts of reed switch 121–2 are closed. This pattern of open and closed switches represents the four-digit binary number "0010," where the first and second "0's" on the left are represented by open reed switches 121–4 and 121–3, respectively, the "1" is represented by the closed reed switch 121–2, and the "0" on the right is represented by the open reed switch 121–1. The table in FIG. 4A summarizes the open and closed conditions of the various switches for each of the ten values in four-digit binary numbers based upon this representation. Thus, the value seven is represented by the binary number "1111," which means that all of the switches are closed. Examination of FIG. 4B reveals that when pointer 124 has rotated to point to the numeral "7" on dial 123, the code discs will be rotated so that the sector labeled "3" on each disc will be in juxtaposition with the corresponding reed switch. Since the sector labeled "3" on each disc is composed of magnetic material, the contacts of all of the switches will be closed, thereby demonstrating the correspondence between the code number "1111" in the table of FIG. 4A and the configurations of the code discs in FIG. 4B.

Although the indicator units of this invention have been described above in terms of a decimal number system, it is apparent that these indicator units may be adapted to any number system by appropriately modifying the number of code discs in each indicator unit and the configuartions of the magnetic and nonmagnetic sectors of the code discs.

It is to be understood that the above-described arrangements are merely illustrative of applications of the principles of the invention. Numerous other arrangements may be devised by those skilled in the art without departing from the spirit and scope of the invention.

What is claimed is:
1. A telemetering system that comprises
   a central station including
   a source of interrogating signal,
   a plurality of remote stations,
   transmission medium for sending said interrogating signal from said central recording station to said remote stations,
   means at each of said remote stations for automatically converting said interrogating signal into a data signal representative of the reading of each of said remote stations, each of said converting means including
   a meter having a plurality of indicator units, each of said indicator units including
   a stationary dial face and an indicating pointer therefor secured to a rotatable shaft driven by said meter,
   a plurality of code discs mounted on said rotatable shaft in substantially parallel spaced relation to said dial face, the annulus of each of said code discs being constructed of magnetic and nonmagnetic sectors according to a prearranged code, and
   a plurality of switching means each of which is provided with a pair of magnetically actuated contacts separated by a gap and is disposed with respect to one of said code discs so that the gap between said contacts is closed whenever the edge of a magnetic sector of the respective disc is rotated by said shaft to be in juxtaposition with said gap,
   a plurality of resistance networks corresponding to said plurality of indicator units, each of said resistance networks being provided with an input terminal, an output terminal, and a plurality of series-connected resistance elements in one-to-one correspondence with said switching means in each of said indicator units,
   means for connecting each of said switching means in parallel with said corresponding resistance element so that the resistance of said network varies as said discs are rotated by said shaft with respect to said switching means,
   means for sequentially applying said interrogating signal to the input terminal of each of said resistance networks,
   oscillator means for developing from said sequentially applied interrogating signal a data signal comprising a sequence of components each having a frequency representative of the resistance of one of said networks,
   common conducting means for connecting the output terminals of said networks to said oscillator, and
   means for connecting said oscillator means to said transmission medium.

2. Apparatus for adapting to a telemetering system a meter having a stationary dial face and an indicating pointer therefor secured to a rotatable shaft driven by said meter comprising, in combination,
   a plurality of code discs mounted on said rotatable shaft in substantially parallel spaced relation to said dial face, the annulus of each of said code discs being constructed of magnetic and nonmagnetic sectors according to a predetermined coding arrangement,
   a plurality of switches having magnetically actuated contacts separated by a gap and disposed in one-to-one correspondence with said code discs so that the gap between the contacts of each of said switches is closed whenever the edge of a magnetic sector of the corresponding disc is rotated by said shaft to be in juxtaposition with said gap,
   a resistance network including an input terminal, an output terminal, and a plurality of series-connected resistance elements in one-to-one correspondence with said switches,
   means for connecting each of said switches in parallel with said corresponding resistance element so that the resistance of said network varies as the magnetic and nonmagnetic sectors of said code discs are rotated by said shaft with respect to said switches, the instantaneous resistance of said network thereby indicating the instantaneous reading of said pointer with respect to said dial face,
   a source of an interrogating signal,
   means for applying said interrogating signal to the input terminal of said network,
   an oscillator for developing from said applied interrogating signal a data signal with a frequency representative of the instantaneous resistance of said network, and
   means for connecting the output terminal of said network to said oscillator.

3. Apparatus for adapting to a telemetering system a meter having a plurality of indicator units, each indicator unit including a stationary dial face and an indicating pointer therefor secured to a rotatable shaft driven by said meter, comprising, in combination,
   a plurality of code discs mounted in each indicator unit on said rotatable shaft in substantially parallel spaced relation to said dial face, the annulus of each of said code discs being constructed of magnetic and nonmagnetic sectors according to a predetermined coding arrangement,
   a plurality of switches having magnetically actuated contacts separated by a gap and disposed in each indicator unit in one-to-one correspondence with said code discs so that the gap between the contacts of each of said switches is closed whenever the edge of a magnetic sector of the corresponding disc is in juxtaposition with said gap,
   a plurality of resistance networks in one-to-one correspondence with said indicator units, each resistance network including an input terminal, an output terminal, and a plurality of series-connected resistance elements in one-to-one correspondence with said plurality of switches disposed in each indicator unit,
   means for connecting each of said switches in parallel with said corresponding resistance element so that the resistance of each of said networks varies as the magnetic and nonmagnetic sectors of said code discs in said corresponding indicator unit are rotated by said shaft with respect to said switches, the instantaneous resistance of each of said networks thereby indicating the instantaneous reading of said pointer with respect to said dial face,
   a source of an interrogating signal,
   means for successively applying said interrogating signal to the input terminal of each of said networks,
   an oscilator for developing from said successively applied interrogating signal a data signal comprising a plurality of components each having a frequency representative of the instantaneous resistance of one of said networks, and
   common conductor means for connecting the output terminals of said networks to said oscillator.

4. Coding apparatus for converting an incoming interrogating signal into an outgoing data signal representative of the reading of a meter having a stationary dial face and an indicating pointer therefor secured to a rotatable shaft driven by said meter which comprises
   a plurality of code discs mounted on said rotatable shaft in substantially parallel spaced relation to said dial face, the annulus of each of said code discs being constructed of magnetic and nonmagnetic sectors according to a prearranged code,
   an electrical network having an input and an output point and including a plurality of magnetic reed switches each of which is in parallel with a predetermined resistance element, each of said magnetic red switches comprising a pair of magneticaly actuated contacts separated by a gap and each of said magnetic reed switches disposed with respect to one of said code discs so that the gap between said contacts is closed whenever the edge of a magnetic sector of the respective disc is rotated by said shaft to be in juxtaposition with said gap, and means for applying said interrogating signal to said input point of said electrical network so that there is developed at said output point of said electrical network a data signal representative of the open and closed condition of the contacts of said switches.

5. Coding apparatus comprising a stationary dial face inscribed with ten equally spaced decimal numerals "0" through "9" in sequence, an indicating pointer for said dial face secured to a rotatable shaft, four code discs mounted on said shaft in substantially parallel spaced relation to said dial face, each of said code discs having an annulus constructed of magnetic and nonmagnetic sectors according to a predetermined code, wherein the size and location of each magnetic and nonmagnetic sector is constructed to represent in coded form the position of said pointer with respect to said numerals on said dial face, and four magnetic reed switches, each of which is provided with a pair of magnetically actuated contacts separated by a gap and each of which is disposed with respect to one of said code discs so that the gap between said contacts is closed whenever the edge of a magnetic sector of the respective disc is rotated by said shaft to be in juxtaposition with said gap.

References Cited by the Examiner
UNITED STATES PATENTS

| | | | |
|---|---|---|---|
| 1,530,936 | 3/1925 | Greenwood | 200—19 |
| 1,889,597 | 11/1932 | Fitzgerald | 179—2 |
| 2,807,664 | 9/1957 | Kleinberg et al. | 340—345 |
| 2,829,229 | 3/1958 | Metz | 317—147 XR |
| 2,870,258 | 1/1959 | Cooper | 340—183 |
| 3,046,534 | 7/1962 | Constant | 340—347 |
| 3,072,894 | 1/1963 | Chapin | 340—151 X |
| 3,087,030 | 4/1963 | Shebanow | 200—19 |
| 3,104,382 | 9/1963 | Morgan et al. | 340—347 X |
| 3,114,020 | 12/1963 | Hall | 200—87 |
| 3,127,594 | 3/1964 | Roe et al. | 317—148.5 X |
| 3,133,173 | 5/1964 | Vriens | 200—87 |

FOREIGN PATENTS

| | | |
|---|---|---|
| 475,525 | 4/1929 | Germany. |
| 299,572 | 1928 | Great Britain. |

OTHER REFERENCES

Publication: "Recording Flow Meter Readings," by Paul Constant, Electronics Industries, May 1961; pp. 156–159.

NEIL C. READ, *Primary Examiner.*

P. XIARHOS, A. WARING, *Assistant Examiners.*